United States Patent
Okano et al.

(10) Patent No.: US 10,268,820 B2
(45) Date of Patent: Apr. 23, 2019

(54) MALWARE DETERMINATION DEVICE, MALWARE DETERMINATION SYSTEM, MALWARE DETERMINATION METHOD, AND PROGRAM

(71) Applicant: NIPPON TELEGRAPH AND TELEPHONE CORPORATION, Chiyoda-ku (JP)

(72) Inventors: Yasushi Okano, Musashino (JP); Shingo Orihara, Musashino (JP); Tetsuya Abe, Musashino (JP); Hiroshi Asakura, Musashino (JP); Atsutoshi Kumagai, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 119 days.

(21) Appl. No.: 15/315,903

(22) PCT Filed: Jun. 8, 2015

(86) PCT No.: PCT/JP2015/066527
§ 371 (c)(1),
(2) Date: Dec. 2, 2016

(87) PCT Pub. No.: WO2015/190446
PCT Pub. Date: Dec. 17, 2015

(65) Prior Publication Data
US 2017/0098074 A1    Apr. 6, 2017

(30) Foreign Application Priority Data

Jun. 11, 2014 (JP) .................. 2014-120428

(51) Int. Cl.
*H04L 29/06* (2006.01)
*G06F 21/56* (2013.01)
*G06N 99/00* (2019.01)

(52) U.S. Cl.
CPC .......... *G06F 21/56* (2013.01); *G06F 21/567* (2013.01); *G06N 99/005* (2013.01); *H04L 63/1433* (2013.01)

(58) Field of Classification Search
CPC ...... G06F 21/56; G06F 21/567; G06N 99/005
See application file for complete search history.

(56) References Cited

U.S. PATENT DOCUMENTS

| 8,635,171 B1 | 1/2014 | Kennedy | |
| 2009/0260087 A1* | 10/2009 | Ishida | H04L 63/0245 726/25 |

(Continued)

FOREIGN PATENT DOCUMENTS

| CN | 1955960 A | 5/2007 |
| EP | 2 182 458 A1 | 5/2010 |

(Continued)

OTHER PUBLICATIONS

Hitoshi Sakano, et al., "Horror Story: The Curse of Dimensionality, For Beginners of Identification Problem, Pattern Recognition, and Data Mining (the first part)," IPSJ Magazine, vol. 43, No. 5, May 2002, (6 pages).

(Continued)

*Primary Examiner* — Shawnchoy Rahman
(74) *Attorney, Agent, or Firm* — Oblon, McClelland, Maier & Neustadt, L.L.P.

(57) ABSTRACT

A malware determination device, in which, upon input of an attribute name and an attribute value of an attribute of an executable file, a feature-selection setting unit registers the attribute with the attribute name in an attribute table as an (Continued)

attribute to be extracted, and registers the attribute value as an attribute value to be deleted in an attribute value table. Upon input of an executable file to be learned or to be determined, a feature extraction unit extracts an attribute value of an attribute registered as an attribute to be extracted in the attribute table from the executable file, to generate a feature vector including the extracted attribute value as a feature. A feature selection unit performs deletion of an attribute value registered as an attribute value to be deleted in the attribute value table from the feature vector.

7 Claims, 7 Drawing Sheets

(56) References Cited

U.S. PATENT DOCUMENTS

| | | | |
|---|---|---|---|
| 2012/0137367 A1* | 5/2012 | Dupont | G06F 21/00 726/25 |
| 2012/0210422 A1 | 8/2012 | Friedrichs et al. | |
| 2012/0210423 A1 | 8/2012 | Friedrichs et al. | |
| 2012/0227105 A1 | 9/2012 | Friedrichs et al. | |
| 2014/0090061 A1 | 3/2014 | Avasarala et al. | |
| 2015/0026810 A1 | 1/2015 | Friedrichs et al. | |
| 2015/0200962 A1 | 7/2015 | Xu et al. | |

FOREIGN PATENT DOCUMENTS

| | | |
|---|---|---|
| JP | 2012-27710 A | 2/2012 |
| JP | 2013-222422 A | 10/2013 |
| JP | 2014-504399 A | 2/2014 |
| WO | WO 2013/184653 A1 | 12/2013 |

OTHER PUBLICATIONS

Hitoshi Sakano, et al., "Horror Story: The Curse of Dimensionality, For Beginners of Identification Problem, Pattern Recognition, and Data Mining (the second part)," IPSJ Magazine, vol. 43, No. 6, Jun. 2002, (6 pages).

M. Zubair Shafiq, et al., "PE-Miner: Mining Structural Information to Detect Malicious Executables in Realtime," RAID 2009, LNCS 5758, 2009, pp. 121-141.

International Search Report dated Sep. 1, 2015 in PCT/JP2015/066527 filed Jun. 8, 2015.

Japanese Office Action dated Sep. 21, 2016 in JP2016-527799 filed Jun. 8, 2015 (with English translation).

Extended European Search Report dated Nov. 10, 2017 in Patent Application No. 15806424.6.

Office Action dated Oct. 9, 2018 in Chinese Application No. 201580030423.0 (w/partial English translation).

* cited by examiner

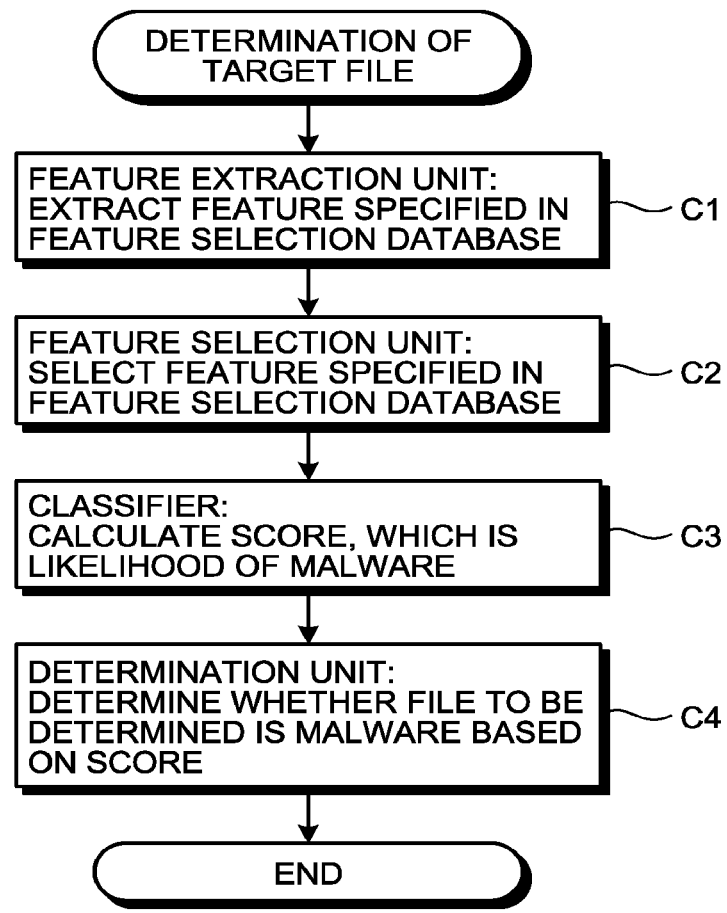

FIG.3

ATTRIBUTE TABLE

| ATTRIBUTE NAME | ON/OFF |
|---|---|
| File name | ON |
| File size | ON |
| ICON image | OFF |
| Characteristics | ON |
| Number of sections | OFF |
| Linker version | OFF |
| Size of code | ON |
| Entry point | ON |
| Base of code | ON |
| Base of data | ON |
| Image base | OFF |
| Section alignment | ON |
| Section name | ON |
| Section flag | ON |
| Section size of raw data | OFF |
| Imports DLL | ON |
| Imports API | ON |
| … | … |

ATTRIBUTE VALUE TABLE 1

| ATTRIBUTE NAME | VALUE TO BE EXCLUDED |
|---|---|
| Characteristics | Executable |
| Characteristics | 32 bit word machine |
| Section alignment | 1000 |
| File alignment | 200 |
| Section name | .text |
| Section name | .bss |
| Section name | .rdata |
| Section name | .rsrc |
| … | … |

ATTRIBUTE VALUE TABLE 2

| ATTRIBUTE NAME | VALUE TO BE INCLUDED |
|---|---|
| Import DLL | WINSOCK32.DLL |
| Import DLL | WININET.DLL |
| ... | |

MALWARE DETERMINATION DEVICE, MALWARE DETERMINATION SYSTEM, MALWARE DETERMINATION METHOD, AND PROGRAM

FIELD

The present invention relates to a technique for determining whether an executable file used on an OS (Operating System) is malware (malicious software).

BACKGROUND

In recent years, there have been proposed various methods for determining whether an executable file used on the OS such as MS-Windows®, Apple OS-X, Linux® and Unix® is malware. For example, in an antivirus system that determines whether an executable file used in MS-Windows, Unix, and the like is malware, two methods, that is, dynamic determination for performing determination by executing the executable file, and static determination for performing determination without executing the executable file are used. When a high speed is particularly required for the determination, the static determination is used. As a method for the static determination, hash value matching determination and pattern matching determination (signature scanning) can be mentioned as a representative method. The hash value matching determination is performed in such a manner that hash values such as MD (Message Digest Algorithm) 5, SHA (Secure Hash Algorithm) 1, and SHA 256 of the existing malware are registered in a database beforehand, and if a hash value of an executable file to be determined matches the hash value registered in the database, the executable file is determined to be the malware. The pattern matching determination is performed in such a manner that specific character strings and byte codes included in the existing malware are registered in a database beforehand, and if an executable file to be determined includes any of the character strings and the byte codes registered in the database, the executable file is determined to be the malware. These methods have an advantage in that an erroneous detection rate (a rate of erroneously determining an executable file that is not malware to be malware) is small. However, it is difficult to detect a subtype of malware obtained by altering the existing malware or a new type of malware.

Therefore, as a method of determining whether an executable file to be determined is a subtype or new type of malware, heuristic determination has been proposed. This method is to define the likelihood of malware based on the past experience and perform determination according to the definition.

As the heuristic determination, various methods using a machine learning technique have been proposed. A technique described in Patent Literature 1 is such that readable character strings included in an executable file are learned beforehand, to determine the likelihood of malware of the executable file based on how many words frequently used in the malware are included in the executable file to be determined.

In machine learning, an executable file (teacher data) is first converted to several sets of parameters, to perform learning based on a machine learning algorithm. The set of parameters is referred to as "feature vector", or simply as "feature", and the number of parameters included in the set is referred to as "feature vector dimension". Conversion of the executable file to the feature vector is referred to as "feature extraction". As an example of the feature vector, in the technique described in Patent Literature 1, a set of a word name of a word and the number of appearances of the word is the feature vector, and the number of word types is the feature vector dimension.

The determination accuracy does not always increase as the feature vector dimension becomes larger, and on the contrary, the determination accuracy may become worse. This phenomenon has been known as "the curse of dimensionality" (Non Patent Literatures 1 and 2). In a technique described in Patent Literature 3, it is attempted to perform malware determination by machine learning using PE (Portable Executable) header information of an executable file. It is described that the feature vector dimension is decreased by using a method referred to as "dimensional compression", and better determination accuracy can be acquired. As a method frequently used for the dimensional compression, for example, there is analysis of principal component. This is a method of combining features having a correlation as one feature automatically (for example, two features of human body height and weight are generally in a proportional relation, and thus these two features are combined in one feature. In this example, the feature combined in one can be defined as a body size, for example. However, it is normally difficult to define the feature combined in one.

CITATION LIST

Patent Literature

Patent Literature: Japanese Patent Application Laid-open No. 2012-027710

Non Patent Literatures

Non Patent Literature 1: Hitoshi SAKANO, Keiji YAMADA, "Horror Story: The Curse of Dimensionality, For Beginners of Identification Problem, Pattern Recognition, and Data Mining (the first part)", Information Processing, vol. 43, no. 5, pp. 562-567 (2002)

Non Patent Literature 2: Hitoshi SAKANO, Keiji YAMADA, "Horror Story: The Curse of Dimensionality, For Beginners of Identification Problem, Pattern Recognition, and Data Mining (the second part)", Information Processing, vol. 43, no. 6, pp. 658-663 (2002)

Non Patent Literature 3: Shafiq, et al., "PE-Miner: Mining Structural Information to Detect Malicious Executables in Realtime", RAID '09, 2009.

SUMMARY

Technical Problem

In order to acquire better determination accuracy when applying the machine learning technique to the malware determination, as described above, it is necessary to adjust the feature vector, for example, to decrease the feature vector dimension. However, the technique described in Patent Literature 1 does not explicitly have the function of performing adjustment of the feature vector.

The technique described in Non Patent Literature 3 performs adjustment of the feature vector according to a method referred to as "dimensional compression". In the malware determination, required determination accuracy may be different according to the purpose. For example, for a general user, it is particularly required to decrease the erroneous detection rate. Meanwhile, for an expert to collect new types of malware, even if there are some cases of erroneous detection, it may be desired to increase the detection rate (a rate of determining an executable file being malware accurately as the malware). Because the method by using the dimensional compression is performed substantially automatically, it contributes to improve the detection accuracy in general. However, it has been difficult to adjust the feature vector according to the purpose such as particularly decreasing the erroneous detection rate. Further, the dimensional compression such as the analysis of principal component is a method of mechanically generating another feature by combining a certain feature with another feature. Therefore, it is difficult for a human to understand the generated feature, and adjustment of the feature vector while taking the expert's knowledge into consideration cannot be performed.

An object of the present invention is to provide a technique that can perform adjustment of a feature vector according to its purpose, without performing automatic conversion of a feature such as dimensional compression.

Solution to Problem

A malware determination device includes:

a feature selection database including an attribute table and an attribute value table;

a feature-selection setting unit that, upon input of an attribute name of an attribute of an executable file, registers an attribute having the input attribute name in the attribute table as an attribute to be extracted, and upon input of an attribute value of an attribute of an executable file, registers the input attribute value in the attribute value table as an attribute value to be deleted or as an attribute value not to be deleted;

a feature extraction unit that, upon input of an executable file, extracts an attribute value of an attribute registered as an attribute to be extracted in the attribute table from the executable file to generate a feature vector including the extracted attribute value as a feature;

a feature selection unit that performs deletion of an attribute value registered as an attribute value to be deleted or deletion of an attribute value other than attribute values registered as attribute values not to be deleted in the attribute value table from the feature vector generated by the feature extraction unit, to reconstruct the feature vector;

a classifier that, when the feature selection unit reconstructs a feature vector of an executable file to be learned, performs machine learning of the executable file to be learned based on the feature vector and information indicating whether the feature vector of the executable file to be learned is malware, and that, when the feature selection unit reconstructs a feature vector of an executable file to be determined, calculates a score of the likelihood of malware for the executable file to be determined based on a result of the machine learning and the feature vector; and a determination unit that determines whether the executable file to be determined is malware based on the score of the executable file to be determined calculated by the classifier.

A first malware determination system includes:
the malware determination device and
a feature-selection trial device, wherein
the feature-selection trial device includes
a feature-selection instruction unit that repeats a process of selecting one set from sets obtained by combining one or more sets of features including an attribute name and an attribute value of an attribute of an executable file and inputting the selected set to the feature-selection setting unit of the malware determination device, a validation unit that each time the feature-selection instruction unit inputs the set to the feature-selection setting unit, repeats a process of inputting an executable file to be determined after inputting an executable file to be learned to the feature extraction unit of the malware determination device, and an index calculation unit that each time the feature-selection instruction unit inputs the set to the feature-selection setting unit, acquires a determination result including a score of the executable file to be determined and information indicating whether the executable file to be determined has been determined to be malware, for each of executable files to be determined that have been input repeatedly to the feature extraction unit by the validation unit, from the determination unit of the malware determination device, to calculate an index indicating a degree of determination accuracy of the determination unit based on the determination result, and the feature-selection instruction unit selects a set having a highest index calculated by the index calculation unit from the sets input to the feature-selection setting unit and inputs the selected set to the feature-selection setting unit.

A second malware determination system includes:
the malware determination device and
a user interface, wherein
the user interface includes
a feature-list acquisition unit that acquires an attribute name and an attribute value of an attribute of an executable file, and a feature-selection input unit that displays a setting screen including a list of attribute names and attribute values acquired by the feature-list acquisition unit, and
the feature-selection input unit displays attribute names on the setting screen together with a first check box, and regarding an attribute name of an attribute registered as an attribute to be extracted in the attribute table, checks the first check box, displays attribute values on the setting screen together with a second check box, and regarding an attribute value other than attribute values registered as attribute values to be deleted or an attribute value registered as an attribute value not to be deleted in the attribute value table, checks the second check box, and when a checked state of the first check box or the second check box is manually changed, inputs an attribute name checked in the first check box after the change to the feature-selection setting unit of the malware determination device, and inputs an attribute value not checked in the second check box or a checked attribute value after the change to the feature-selection setting unit of the malware determination device.

A malware determination method performed by a malware determination device, the malware determination method including:

a feature-selection setting step at which, upon input of an attribute name of an attribute of an executable file, the attribute with the input attribute name is registered in an attribute table as an attribute to be extracted, and upon input of an attribute value of an attribute of an executable file, the input attribute value is registered in an attribute value table as an attribute value to be deleted or as an attribute value not to be deleted, a feature extraction step at which, upon input of an executable file, an attribute value of an attribute registered as an attribute to be extracted in the attribute table is extracted from the executable file and a feature vector including the extracted attribute value as a feature is generated, a feature selection step of performing deletion of an attribute value registered as an attribute value to be deleted or deletion of an attribute value other than attribute values registered as attribute values not to be deleted in the attribute value table from the feature vector generated at the feature extraction step, to reconstruct the feature vector, a classification step at which, when a feature vector of an executable file to be learned is reconstructed at the feature selection step, machine learning of the executable file to be learned is performed based on the feature vector and information indicating whether the feature vector of the executable file to be learned is malware, and at which, when a feature vector of an executable file to be determined is reconstructed at the feature selection step, a score of likelihood of malware is calculated for the executable file to be determined based on a result of the machine learning and the feature vector, and a determination step of determining whether the executable file to be determined is malware based on the score of the executable file to be determined calculated at the classification step.

A program that causes a computer to function as:

a storage unit including an attribute table and an attribute value table;

a feature-selection setting unit that, upon input of an attribute name of an attribute of an executable file, registers an attribute with the input attribute name in the attribute table as an attribute to be extracted, and upon input of an attribute value of an attribute of an executable file, registers the input attribute value in the attribute value table as an attribute value to be deleted or as an attribute value not to be deleted;

a feature extraction unit that, upon input of an executable file, extracts an attribute value of an attribute registered as an attribute to be extracted in the attribute table from the executable file, to generate a feature vector including the extracted attribute value as a feature;

a feature selection unit that performs deletion of an attribute value registered as an attribute value to be deleted or deletion of an attribute value other than attribute values registered as attribute values not to be deleted in the attribute value table, to reconstruct the feature vector;

a classification unit that, when the feature selection unit reconstructs a feature vector of an executable file to be learned, performs machine learning of the executable file to be learned based on the feature vector and information indicating whether the feature vector of the executable file to be learned is malware, and that, when the feature selection unit reconstructs a feature vector of an executable file to be determined, calculates a score of likelihood of malware for the executable file to be determined based on a result of the machine learning and the feature vector; and a determination unit that determines whether the executable file to be determined is malware based on the score of the executable file to be determined calculated by the classification unit.

Advantageous Effects of Invention

According to the malware determination device of the present invention, upon input of an attribute name and an attribute value, the feature-selection setting unit registers an attribute with the attribute name in the attribute table as an attribute to be extracted, and registers the attribute value in the attribute value table as an attribute value to be deleted or as an attribute value not to be deleted. When malware determination is to be performed by machine learning, the feature extraction unit extracts an attribute value of only the attribute registered as an attribute to be extracted in the attribute table to generate a feature vector. The feature selection unit further deletes an attribute value to be deleted registered in the attribute value table or an attribute value other than the attribute values registered as an attribute not to be deleted.

Therefore, by specifying unnecessary or useful attribute and attribute value, features related to the unnecessary attribute and attribute value can be deleted from the feature vector, or only features related to the useful attribute and attribute value can be included in the feature vector. Accordingly, adjustment of the feature vector such as reduction of the feature vector dimension can be performed, while improving the determination accuracy.

Because automatic conversion of the feature such as dimensional compression is not performed, the feature vector can be adjusted while taking the expert's knowledge into consideration.

Furthermore, by specifying the attribute and the attribute value according to the purpose, adjustment of the feature vector can be performed according to the purpose.

BRIEF DESCRIPTION OF DRAWINGS

FIG. 2C is a flowchart for explaining an outline of a target-file determination process performed by the malware determination device according to the first embodiment of the present invention.

FIG. 3 is an explanatory diagram of an attribute table and an attribute value table 1 in the malware determination device according to the first embodiment of the present invention.

DESCRIPTION OF EMBODIMENTS

Exemplary embodiments according to the present invention will be explained below in detail with reference to the accompanying drawings.

As the method of decreasing the feature vector dimension, there is a method referred to as "feature selection" other than the dimensional compression. This method is to search for a feature vector of a combination having intended determination accuracy by making a choice from respective features to decrease the feature vector dimension.

As the method of decreasing the feature vector dimension, the malware determination device of the present invention uses the feature selection described above.

(1) First Embodiment (1-1) Configuration of First Embodiment

Figure 1:
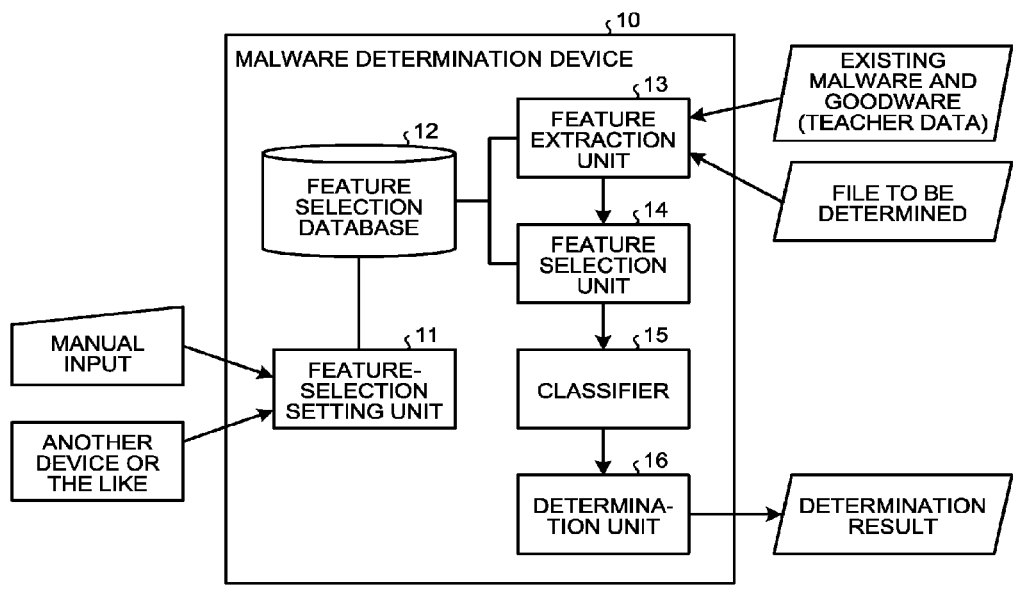
FIG. 1 is a configuration diagram illustrating a configuration of a malware determination device according to a first embodiment of the present invention.

FIG. 1 illustrates a configuration diagram of a malware determination device 10 according to a first embodiment of the present invention.

As illustrated in FIG. 1, the malware determination device 10 of the present embodiment includes a feature-selection setting unit 11, a feature selection database (storage unit) 12, a feature extraction unit 13, a feature selection unit 14, a classifier 15, and a determination unit 16.

The malware determination device 10 according to the present embodiment performs machine learning of PE/COFF (Portable Executable/Common Object File Format) header information of an executable file to be learned, to determine whether the executable file to be determined is the malware. The malware determination device 10 has a feature selection function that can select a feature to be included in a feature vector at the time of learning and determination.

(1-2) Operation of First Embodiment

Figure 2A:
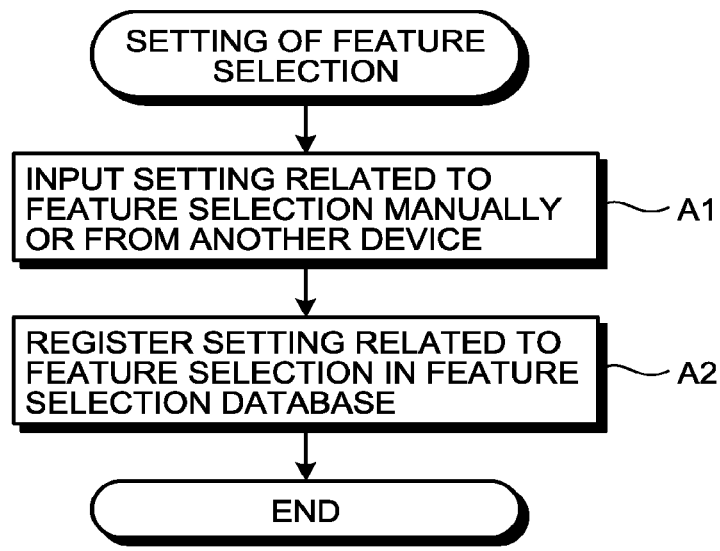
FIG. 2A is a flowchart for explaining an outline of a feature-selection setting process in the malware determination device according to the first embodiment of the present invention.

The malware determination device 10 according to the present embodiment first sets a feature to be included in a feature vector (a feature-selection setting process, FIG. 2A). The malware determination device 10 then performs machine learning of teacher data configured to include the existing malware and an executable file, which is not the malware (goodware) (a teacher-data learning process, FIG. 2B). After the learning, the malware determination device 10 can determine whether the executable file to be determined is the malware (a target-file determination process, FIG. 2C).

The feature-selection setting process, the teacher-data learning process, and the target-file determination process performed by the malware determination device 10 according to the present embodiment are described below individually.

(1-2-1) Feature-Selection Setting Process

FIG. 2A is a flowchart for explaining an outline of the feature-selection setting process in the malware determination device 10 according to the present embodiment.

As illustrated in FIG. 2A, upon input of setting related to feature selection manually or from another device (Step A1), the feature-selection setting unit 11 registers the setting related to feature selection in the feature selection database 12 (Step A2).

Setting related to feature selection is configured to include an attribute name of an attribute such as the PE/COFF header information extracted from the executable file and an attribute value to be deleted from the feature, of the attribute values of the respective attributes.

FIG. 3 illustrates a data structure of the feature selection database 12.

As illustrated in FIG. 3, the feature selection database 12 includes an attribute table and an attribute value table 1.

The feature-selection setting unit 11 reflects the attribute name of the attribute extracted from the executable file in the attribute table. Specifically, the feature-selection setting unit 11 handles the attribute described in the setting related to feature selection as an attribute to be extracted from the executable file, and registers a value in an ON/OFF field of the attribute name of the attribute as ON in the attribute table. On the other hand, the feature-selection setting unit 11 handles the attribute not described in the setting related to feature selection as an attribute not to be extracted from the executable file, and registers a value in the ON/OFF field of the attribute name of the attribute as OFF in the attribute table.

The feature-selection setting unit 11 reflects the attribute value to be deleted from the feature, of the attribute values of the respective attributes, in the attribute value table 1. Specifically, the feature-selection setting unit 11 handles the attribute value described in the setting related to feature selection as the attribute value to be deleted from the feature vector, and registers the attribute value in the attribute value table 1.

(1-2-2) Teacher-Data Learning Process

Figure 2B:
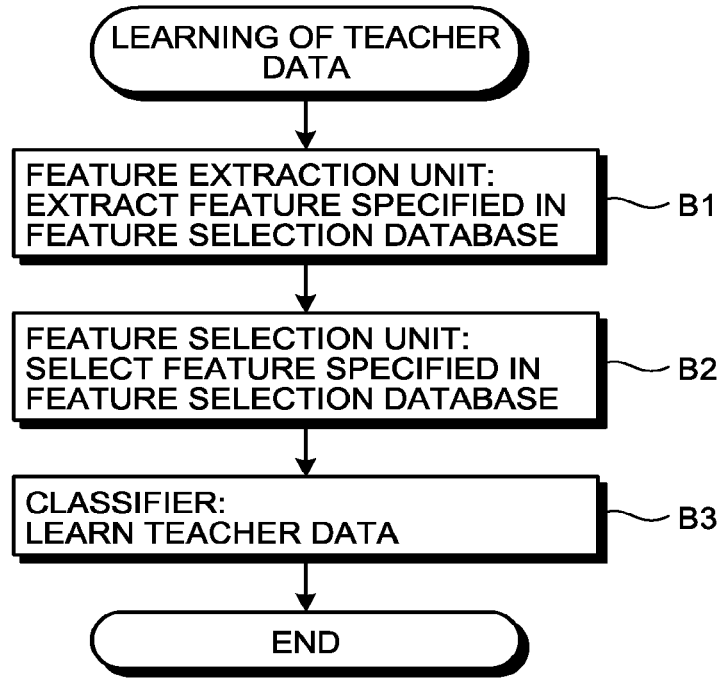
FIG. 2B is a flowchart for explaining an outline of a teacher-data learning process in the malware determination device according to the first embodiment of the present invention.

FIG. 2B is a flowchart for explaining an outline of the teacher-data learning process in the malware determination device 10 according to the present embodiment.

The teacher data to be used in the teacher-data learning process is configured to include an executable file, which is the existing malware and goodware (executable files to be learned), and information indicating a classification of whether the executable file is the malware. Information in which a portion where the PE/COFF header information is described is cut out from the executable file can be used instead of the executable file.

The feature extraction unit 13, the feature selection unit 14, and the classifier 15 process the teacher data in this order.

As illustrated in FIG. 2B, upon input of the teacher data, the feature extraction unit 13 extracts an attribute value of each attribute in the PE/COFF header information from the executable file in the teacher data, and generates a feature vector including the extracted attribute value as a feature (Step B1). As a method of extracting the attribute value of each attribute in the PE/COFF header information from the executable file, a method of using a tool such as dumpbin.exe (Microsoft Visual C++) or objdump (Unix such as Linux), a method of using a program library used by these tools, or the like can be used. Regarding the attribute value, only an attribute value of an attribute that is ON in the attribute table in the feature selection database 12 is extracted. Accordingly, because an unrequired attribute is deleted from the feature vector, the feature vector dimension is decreased by an amount of the unrequired feature vector. Some of the attributes in the PE/COFF header information have a plurality of values in one attribute. For example, Characteristics attribute has a plurality of values such as "Executable", "32 bit word machine", "Debug Information stripped", and the like. These values are regarded as one feature respectively (in this example, three features are extracted from one attribute). In the attribute having numerical data such as File size, the attribute values are converted to names in a range with an appropriate interval such as below 1 kB, 1 kB to 100 kB, 100 kB to 500 kB, 500 kB to 1 MB, 1 MB or more, and the like and handled. Appropriate weighting such as tf-idf (term frequency-inverse document frequency) can be performed with respect to these values of feature.

The feature selection unit 14 deletes a feature from the feature vector according to the attribute value table 1 to perform feature selection, and reconstructs the feature vector (Step B2). For example, when an attribute value has been registered in the attribute value table 1 as illustrated in FIG. 3, if "Characteristics":"Executable" is included in the feature vector, the feature selection unit 14 deletes the feature "Characteristics":"Executable" from the feature vector.

The classifier 15 receives the feature vector processed by the feature extraction unit 13 and the feature selection unit 14 on a previous stage and classification information indicating whether the executable file to be learned is the malware, and performs machine learning of the executable file to be learned (Step B3). An appropriate classifier such as logistic regression, a support vector machine, a perceptron, Passive-Aggressive, simple Bayes, or a decision tree can be used as the classifier 15.

(1-2-3) Target-File Determination Process

FIG. 2C is a flowchart for explaining an outline of the target-file determination process performed by the malware determination device 10 according to the present embodiment.

The executable file to be determined that is used in the target-file determination process can be the entire executable file, or can be information in which a portion where the PE/COFF header information is described is cut out from the executable file.

The feature extraction unit 13, the feature selection unit 14, the classifier 15, and the determination unit 16 process the executable file to be determined in this order.

Upon input of the executable file to be determined to the feature extraction unit 13, the feature extraction unit 13 and the feature selection unit 14 perform the same process as in (1-2-2) teacher-data learning process with respect to the executable file to be determined (Steps C1 and C2).

The classifier 15 calculates the likelihood of malware of the executable file to be determined by a numerical value such as a score based on a result of machine learning at the time of (1-2-2) teacher-data learning process and the feature vector processed by the feature extraction unit 13 and the feature selection unit 14 on the previous stage (Step C3). As a method of calculating the score of the likelihood of malware, for example, known methods such as a method of performing determination based on how many features frequently used in the malware are included in the feature vector of the executable file to be determined can be used by using the technique described in Patent Literature 1.

The determination unit 16 determines whether the executable file to be determined is the malware based on the score calculated by the classifier 15, and outputs a determination result (Step C4). The determination result can include only information indicating to which of the malware or goodware the executable file to be determined has been classified, or the score calculated by the classifier 15 can be added to the information. As an example of the determination method, there is threshold determination in which if the score is equal to or larger than a certain threshold, the executable file is determined as the malware or if the score is less than the certain threshold, the executable file is determined as the goodware.

Figures 4, 5:
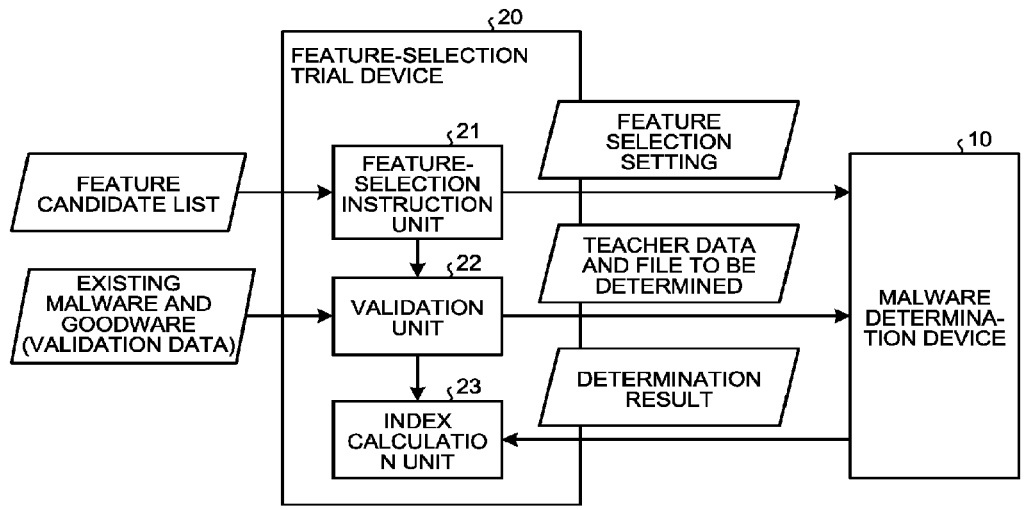
FIG. 4 is an explanatory diagram of an attribute value table 2 in the malware determination device according to the first embodiment of the present invention.
FIG. 5 is a configuration diagram illustrating a configuration of a malware determination system according to a second embodiment of the present invention.

In the present embodiment, the feature selection unit 14 performs a process of deleting the attribute value registered in the attribute value table 1 from the feature vector. However, conversely, the feature selection unit 14 can perform a process of including only the attribute value registered in the attribute value table in the feature vector. In this case, in the setting related to feature selection, an attribute value to be included as the feature is specified instead of the attribute value to be deleted from the feature, an attribute value table 2 in FIG. 4 is prepared instead of the attribute value table 1 in FIG. 3, and the specified attribute value is registered as the attribute value not to be deleted in the attribute value table 2. When the attribute value is registered in the attribute value table 2 as illustrated in FIG. 4, only the attribute values of "Import DLL":"WINSOCK32.DLL" and "Import DLL": "WININET.DLL" are left, and other attribute values of Import DLL attributes are all deleted in the feature vector, as the feature related to the Import DLL attribute.

In the attribute values included in the executable file, there are an attribute value that is almost useless for the malware determination, and an attribute value that is very useful for the malware determination. For example, as the useless attribute value, there is an attribute value "Characteristics": "Executable" that surely appears in all the executable files, and as the useful attribute value, there is an attribute value "Import DLL":"WINSOCK32.DLL" that frequently appears in the malware having a communication function such as spyware. Therefore, the useless attribute value is registered in the attribute value table 1 and deleted from the feature vector, and when the useful attribute value is clearly ascertained, the attribute value table 2 is prepared instead of the attribute value table 1, and the useful attribute value is registered in the attribute value table 2, and determination can be performed by using only the attribute value.

As described above, in the present embodiment, upon input of the attribute name and the attribute value manually or from another device, the feature-selection setting unit 11 registers an attribute with the attribute name in the attribute table as the attribute to be extracted, and registers the attribute value in the attribute value table as the attribute value to be deleted or not to be deleted. At the time of malware determination by machine learning, the feature extraction unit 13 extracts the attribute value of only the attribute registered in the attribute table as the attribute to be extracted, to generate the feature vector. The feature selection unit 14 further deletes the attribute value registered in the attribute value table as the attribute value to be deleted or an attribute value other than the attribute value registered as the attribute value not to be deleted from the feature vector.

Therefore, by specifying unnecessary or useful attributes and attribute values in the malware determination device 10, features related to the unnecessary attributes and attribute values can be deleted from the feature vector, or only the features related to the useful attributes and attribute values can be included in the feature vector. Therefore, adjustment of the feature vector such as reduction of the feature vector dimension can be performed, while improving the determination accuracy. Further, because the feature vector dimension can be decreased, the process performed by the classifier 15 can be reduced, and machine learning and malware determination can be performed at a high speed.

Furthermore, because automatic conversion of the feature such as dimensional compression is not included, specification of attributes and attribute values can be performed while taking the expert's knowledge into consideration. For example, in the attributes of the header information, there is an attribute having a default value such as Section alignment or File alignment. It has been known that the attribute may be out of the default value in the malware. It has been also known that the malware has a greater tendency to use executable file compression software referred to as "packer" than goodware, and it can be determined by a Section flags attribute. Therefore, by using the knowledge, useful attributes and attribute values can be specified.

The packer may be also used in the goodware. Therefore, when it is particularly desired to decrease the erroneous detection rate of the malware determination device 10, the feature vector can be adjusted according to the purpose by specifying only the attribute having the default value or not specifying the Section flag attribute.

(2) Second Embodiment

A malware determination system according to a second embodiment of the present invention automatically inputs setting related to feature selection to the malware determination device 10 illustrated in FIG. 1 from another device.

(2-1) Configuration of Second Embodiment

FIG. 5 illustrates a configuration diagram of the malware determination system according to the second embodiment of the present invention.

As illustrated in FIG. 5, the malware determination system according to the present embodiment is provided with a feature-selection trial device 20 that tries feature selection as another device, in addition to the malware determination device 10. The feature-selection trial device 20 includes a feature-selection instruction unit 21, a validation unit 22, and an index calculation unit 23.

The method of automatically performing feature selection is generally categorized as a wrapper method, a filter method, and an embedded method, and in the present embodiment, the wrapper method is used. The wrapper method actually performs machine learning and classification with respect to various settings of feature selection to measure the accuracy, and searches for the setting of feature selection having the highest accuracy. The search method of the feature combination includes a best-subset selection procedure that tries all the combinations, a step-up procedure that contrives ways to decrease the number of trials, a step-down procedure, a stepwise procedure, and the like. In the present embodiment, a case of using the step-up procedure is described. However, other search methods can be used.

(2-2) Operation of Second Embodiment

A process performed by the feature-selection trial device 20 is described below.

First, an outline of the process performed by the feature-selection trial device 20 is described.

Figure 6:
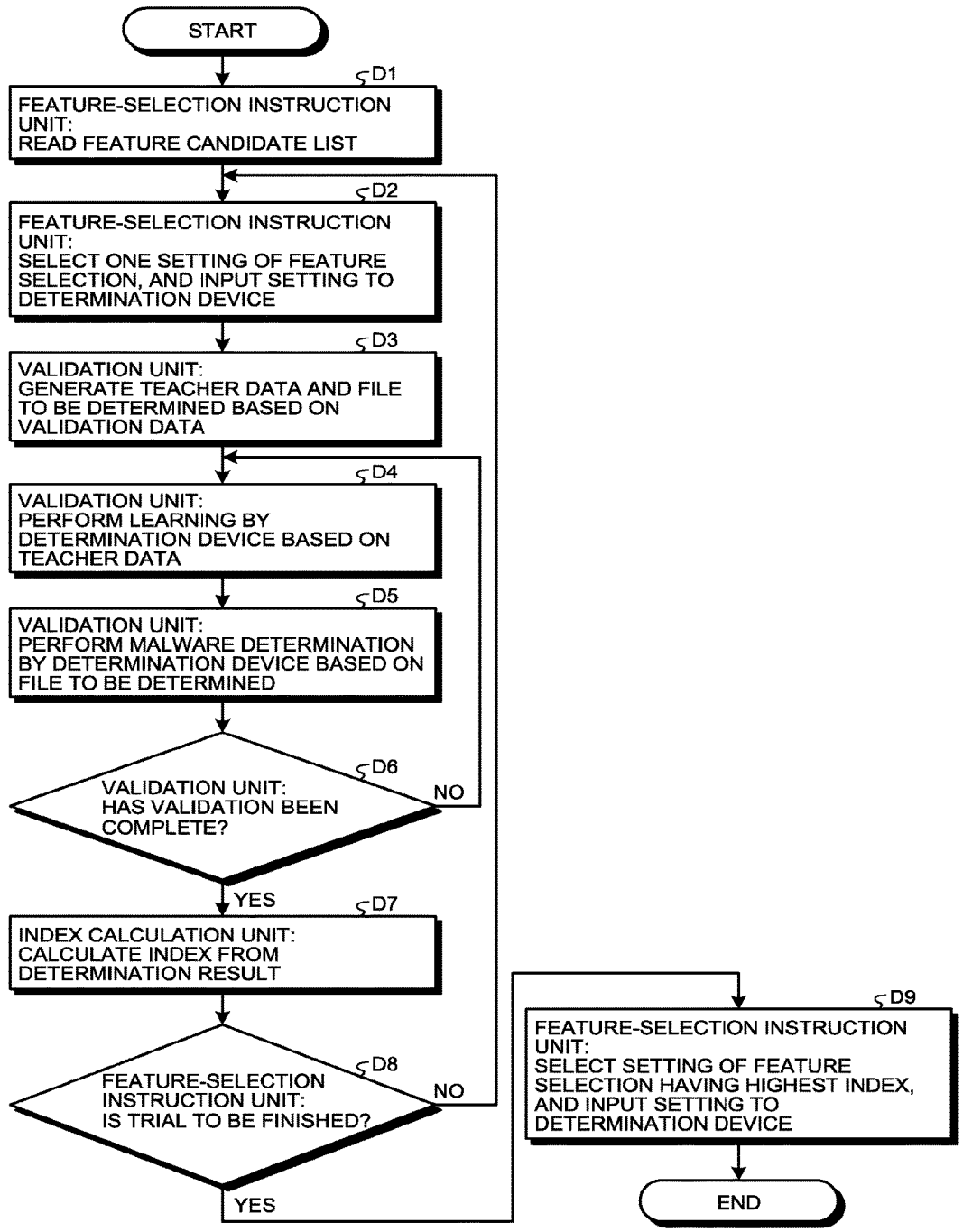
FIG. 6 is a flowchart for explaining an outline of a process performed by a feature-selection trial device according to the second embodiment of the present invention.

FIG. 6 is a flowchart for explaining an outline of the process performed by the feature-selection trial device 20.

As illustrated in FIG. 6, the feature-selection instruction unit 21 first reads a list of features (a feature candidate list) that become candidates at the time of selecting the feature (Step D1). Subsequently, the feature-selection instruction unit 21 selects one setting of feature selection, which is a set combining one or more features including an attribute name and an attribute value, from these candidate features according to the search method, and inputs the selected setting to the malware determination device 10 (Step D2).

The validation unit 22 divides validation data including the existing malware and the existing goodware to generate teacher data and an executable file to be determined (Step D3). Subsequently, the validation unit 22 inputs the teacher data to the malware determination device 10, and after the malware determination device 10 has learned the teacher data (Step D4), the validation unit 22 inputs the executable file to be determined to the malware determination device 10 and causes the malware determination device 10 to determine whether the executable file to be determined is the malware (Step D5). The index calculation unit 23 acquires the determination result (classification information of malware/goodware and a score of the likelihood of malware) (cross validation).

The validation unit 22 repeats Steps D4 and D5 for all the teacher data and the executable files to be determined generated at Step D3.

Upon completion of validation performed by the validation unit 22 (YES at Step D6), the index calculation unit 23 compares the respective determination results of the executable files to be determined with the validation data to perform evaluation, and calculates an index indicating the degree of determination accuracy of the determination unit 16 in the malware determination device 10 (Step D7).

The feature-selection instruction unit 21 determines whether to try another setting of feature selection or to finish the trial based on the index calculated by the index calculation unit 23 (Step D8).

If another setting of feature selection is to be tried, the process returns to Step D2, the feature-selection instruction unit 21 inputs another setting of feature selection to the malware determination device 10, and the subsequent processes are performed.

On the other hand, if another setting of feature selection is to be finished, the feature-selection instruction unit 21 selects setting of feature selection having the highest index (having the highest determination accuracy) among the trials and inputs the selected setting of feature selection to the malware determination device 10 (Step D9), and the process is finished.

Subsequently, the processes described above performed by the feature-selection trial device 20 are described next in more detail.

In the feature candidate list, an attribute name of an attribute and an attribute value of the attribute are described as a feature candidate. The feature-selection trial device 20 variously combines the attribute name and the attribute value described in the feature candidate list to search for a combination having the highest determination accuracy. An example is described here assuming that features A, B, C, and D are described in the feature candidate list. Of course, features to be described in the feature candidate list are not limited to four features, and the attribute name and the attribute value can be freely described.

A step-up procedure, which is a search method used in the present embodiment, is a method in which a feature (or an attribute) to be used is increased one by one, and the process is finished when the determination accuracy (or an index) becomes the highest value. In the case of the candidates A, B, C, and D of the feature in the present example, the determination accuracy is measured in each of settings [A], [B], [C], and [D] of feature selection, and a setting of feature selection having the highest determination accuracy is adopted. In the present example, it is assumed that the setting [A] has the highest determination accuracy. One feature is then added to [A] to measure the determination accuracy in [A B], [A C], and [A D]. At this time, if there is no setting having a higher determination accuracy than the determination accuracy of [A], the process is finished and the setting [A] is designated as a result of feature selection. On the other hand, if there is a setting having the higher determination accuracy than the determination accuracy of [A], the setting of feature selection having the highest determination accuracy is adopted again. In the present example, it is assumed that the setting [A C] has the highest determination accuracy. One feature is added to [A C] to measure the determination accuracy in settings of [A C B] and [A C D] in the same manner. If there is no setting having the higher determination accuracy than the previous setting, the process is finished, and if there is a setting having the higher determination accuracy than the previous setting, the setting of feature selection having the highest determination accuracy is adopted again. This process is repeated until there is no setting of feature selection to be tried.

The feature-selection instruction unit 21 eventually sets settings of feature selection to one setting, and inputs the setting of feature selection to the malware determination device 10.

The validation data to be used by the validation unit 22 is configured by the executable file of the existing malware and goodware and information indicating a classification whether the executable file is the malware as in the teacher data of the first embodiment. As the representative cross validation performed by the validation unit 22, there are hold-out validation in which validation data is divided into two, and validation is performed only once, and N-division cross validation in which validation data is equally divided into N and validation is performed for N times, and either method can be used.

As an index (determination accuracy) calculated by the index calculation unit 23, AUC (Area Under the Curve) is frequently used in the field of machine learning. When the AUC is good (large), both a detection rate and an erroneous detection rate tend to become good. In the present embodiment, the AUC can be used as an index. Another index can be also used. The detection rate and the erroneous detection rate have generally an opposing relation to each other. However, there is a case in which it is desired to increase the detection rate to some extent while suppressing the erroneous detection rate considerably. As the index in this case, a detection rate of the determination unit 16 of the malware determination device 10 when it is adjusted that the erroneous detection rate of the determination unit 16 becomes very low (for example, 0.1% or lower) can be used. Conversely, there is a case in which it is desired to decrease the erroneous detection rate to some extent while increasing the detection rate considerably. As the index in this case, an index (1−erroneous detection rate) by means of an erroneous detection rate of the determination unit 16 when it is adjusted that the detection rate of the determination unit 16 becomes very high (for example, 99.9% or higher) can be used. The adjustment of the erroneous detection rate or the detection rate by the determination unit 16 can be realized, for example, by adjusting a threshold when threshold determination is performed.

After calculation of the index by the index calculation unit 23, the feature-selection instruction unit 21 determines whether to perform trial by using another setting of feature selection or to finish the trial. In the case of the step-up procedure, determination is performed in the order described below. "Number" described below indicates the number of features (attributes) included in the setting of feature selection.

1) If there is a setting not having been tried yet of settings of feature selection having the same number of features, the setting of feature selection not having been tried yet is tried (for example, if only two sets [A B] and [A C] have been tried, the set of [A D] is also tried.

2) The case in which all settings of feature selection having the same number of features have been tried (a) In the case of the present number of features ≠1, and the best index with the present number of features ≤the best index with the present number of features −1, the setting of feature selection having the best index with the present number of features −1 is adopted, and the process is finished ([A] becomes the best setting of feature selection).

(b) In the case other than the case described above, the setting of feature selection having the best index with the present number of features is adopted (the best [A C] is adopted among settings of [A B], [A C], and [A D]).

3) If the number of features is the same as the maximum number (the number of attributes and attribute values included in the feature candidate list), the process is finished. If the number of features is less than the maximum number, the setting of feature selection added with one feature is tried (the setting of feature selection of [A C *] (*=B, D) is tried).

As described above, in the present embodiment, feature selection can be automatically set, and an appropriate index indicating the degree of determination accuracy is calculated by the index calculation unit 23 according to the purpose. Accordingly, the malware determination device 10 having determination accuracy matched with the intended use such as reduction of the erroneous detection rate, improvement of the detection rate, and the like can be configured.

(3) Third Embodiment

A malware determination system according to a third embodiment of the present invention manually inputs setting related to feature selection to the malware determination device 10 illustrated in FIG. 1.

(3-1) Configuration of Third Embodiment

Figure 7:
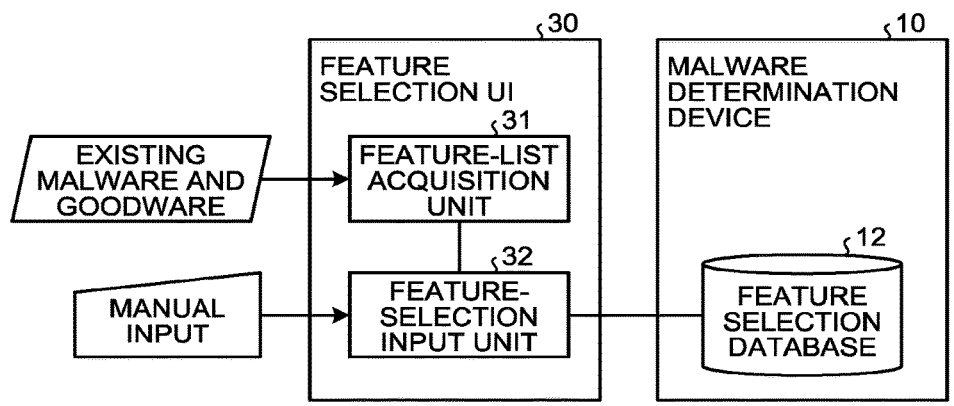
FIG. 7 is a configuration diagram illustrating a configuration of a malware determination system according to a third embodiment of the present invention.

FIG. 7 illustrates a configuration diagram of the malware determination system according to the third embodiment of the present invention.

As illustrated in FIG. 7, the malware determination system according to the present embodiment is provided with a feature selection UI (User Interface) 30 that collects features from the existing malware and goodware and manually performs feature selection by using a list of features, in addition to the malware determination device 10. The feature selection UI 30 includes a feature-list acquisition unit 31 and a feature-selection input unit 32.

The feature-list acquisition unit 31 acquires features from the existing malware and goodware to generate a list of features. The existing malware and goodware can use the teacher data of the first embodiment or the validation data of the second embodiment.

The feature-selection input unit 32 displays a setting screen based on the list of features generated by the feature-list acquisition unit 31 and the information in the feature selection database 12 of the malware determination device 10.

(3-2) Setting Screen of Third Embodiment

The setting screen to be displayed by the feature-selection input unit 32 is described below.

Figure 8:
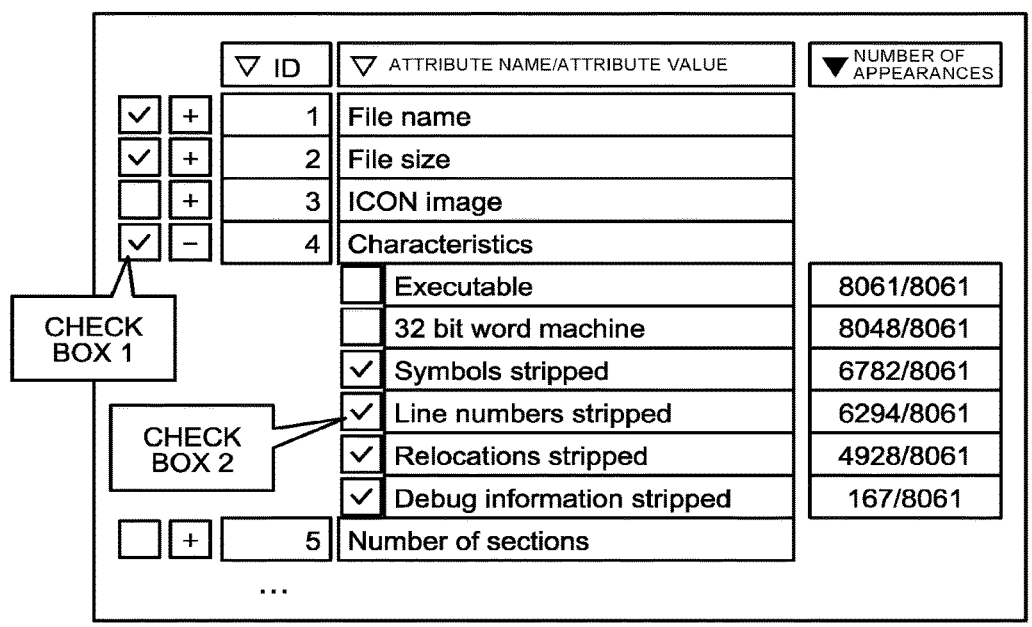
FIG. 8 an explanatory diagram of a setting screen which is displayed on a feature selection UI according to the third embodiment of the present invention.

FIG. 8 illustrates an example of the setting screen.

In FIG. 8, the attribute name/attribute value, and the number of appearances are displayed based on the list of features generated by the feature-list acquisition unit 31. The list of features generated by the feature-list acquisition unit 31 includes the attribute name and the attribute value of the attribute, and information of the number of executable files having the attribute value. As for the attribute name/attribute value, display of only the attribute name of the attribute and display of the attribute name of the attribute and all the attribute values of the attribute can be switched by a +/− button. The number of appearances of the attribute value expresses the number of executable files having the attribute value and the total number of executable files. Display of the number of appearances is contributory to determine that an attribute value appearing too frequently is taken off from the feature vector or the like. Check boxes 1 and 2 are displayed based on the information in the feature selection database 12. The ON/OFF field of the attribute table is reflected in the check box 1, and the attribute name for which the ON/OFF field is ON, that is, the attribute name of the attribute registered in the attribute table as an attribute to be extracted is checked. The contents of the attribute value table 1 are reflected in the check box 2 such that the attribute value registered in the attribute table as the attribute value to be deleted is not checked, and conversely, attribute values other than the attribute value registered as the attribute value to be deleted (attribute values not registered) are checked. On the setting screen, if the checked state of any of the check boxes 1 and 2 is changed manually, the feature-selection input unit 32 inputs the attribute name checked in the check box 1 and the attribute value not checked in the check box 2 as the setting of feature selection to the feature-selection setting unit 11 of the malware determination device 10. Therefore, on the setting screen, setting of feature selection can be easily performed manually by checking the attribute/attribute value desired to be included in the feature vector, and conversely unchecking the attribute/attribute value desired to be excluded.

However, the display function of the number of appearances is not always required. Conversely, a function of displaying the number of appearances for each of the malware and goodware can be provided.

When the attribute value table 2 is prepared instead of the attribute value table 1, the contents of the attribute value table 2 are reflected in the check box 2. That is, the attribute value registered in the attribute value table 2 as the attribute value not to be deleted is checked, and the attribute value other than the attribute value registered in the attribute value table 2 as the attribute value not to be deleted (attribute values not registered) is not checked. If the checked state of any of the check boxes 1 and 2 is changed manually, the attribute value to be input to the malware determination device 10 is the attribute value checked in the check box 2.

As described above, in the present embodiment, feature selection can be set manually, and the check boxes 1 and 2 are used for specifying the attribute name and the attribute value, thereby enabling to provide highly convenient setting of feature selection.

By combining the second embodiment and the third embodiment and after feature selection is automatically set according to the second embodiment, setting of feature selection can be viewed and modified according to the third embodiment.

The malware determination device 10 according to the present invention can be also realized by a computer and a program, and further the program can be recorded in a recording medium and can be provided through a network.

REFERENCE SIGNS LIST

10 malware determination device
11 feature-selection setting unit
12 feature selection database
13 feature extraction unit
14 feature selection unit
15 classifier
16 determination unit
20 feature-selection trial device
21 feature-selection instruction unit
22 validation unit
23 index calculation unit
30 feature selection UI
31 feature-list acquisition unit
32 feature-selection input unit

The invention claimed is:

1. A malware determination device comprising:
a memory that stores a feature selection database including an attribute table and an attribute value table;
processing circuitry configured to
prior to receiving input of an executable file, upon input of an attribute name of an attribute, register an attribute having the input attribute name in the attribute table as an attribute to be extracted, and upon input of an attribute value of an attribute, register the input attribute value in the attribute value table as an attribute value to be deleted or as an attribute value not to be deleted;
upon input of the executable file, extract a first attribute value of an attribute registered as an attribute to be extracted in the attribute table from the executable file to generate a feature vector including the extracted first attribute value as a feature;
perform deletion of a second attribute value registered as an attribute value to be deleted or deletion of an attribute value other than attribute values registered as attribute values not to be deleted in the attribute value table from the generated feature vector, to reconstruct the feature vector;
when the processing circuitry reconstructs a feature vector of an executable file to be learned, perform machine learning of the executable file to be learned based on the feature vector and information indicating whether the feature vector of the executable file to be learned is malware, and that, when the processing circuitry reconstructs a feature vector of an executable file to be determined, calculate a score of the likelihood of malware for the executable file to be determined based on a result of the machine learning and the feature vector; and
determine whether the executable file to be determined is malware based on the calculated score of the executable file to be determined.

2. A malware determination system comprising the malware determination device according to claim 1, and further comprising a feature-selection trial device, wherein
the feature-selection trial device includes
processing circuitry configured to
repeat a process of selecting one set from sets obtained by combining one or more sets of features including an attribute name and an attribute value of an attribute of an executable file and inputting the selected set to the malware determination device,
that each time the malware detection device inputs the set, repeat a process of inputting an executable file to be determined after inputting an executable file to be learned to the malware determination device, and
each time the malware detection device inputs the set, acquire a determination result including a score of the executable file to be determined and information indicating whether the executable file to be determined has been determined to be malware, for each of executable files to be determined that have been input repeatedly to the processing circuitry, from the malware determination device, to calculate an index indicating a degree of determination accuracy of the malware determination device based on the determination result, and
select a set having a highest calculated index from the sets input to the malware detection device and input the selected set to the malware detection device.

3. The malware determination system according to claim 2, wherein the processing circuitry of the feature-selection trial device calculates the index by using a detection rate, which is a rate of determining an executable file to be determined that is malware to be malware correctly, or an erroneous detection rate, which is a rate of erroneously determining an executable file to be determined that is not malware to be malware.

4. A malware determination system comprising the malware determination device according to claim 1, and further comprising a user interface, wherein
the user interface is configured to
acquire an attribute name and an attribute value of an attribute of an executable file, and
display a setting screen including a list of attribute names and attribute values acquired by the user interface ,
display attribute names on the setting screen together with a first check box, and regarding an attribute name of an attribute registered as an attribute to be extracted in the attribute table, checks the first check box,
display attribute values on the setting screen together with a second check box, and regarding an attribute value other than attribute values registered as attribute values to be deleted or an attribute value registered as an attribute value not to be deleted in the attribute value table, checks the second check box, and
when a checked state of the first check box or the second check box is manually changed, input an attribute name checked in the first check box after the change to the malware determination device, and input an attribute value not checked in the second check box or a checked attribute value after the change to the malware determination device.

5. The malware determination system according to claim 4, wherein the user interface displays an attribute value on the setting screen together with number of appearances, which is number of executable files in which the attribute value appears, and total number of executable files.

6. A malware determination method performed by a malware determination device, the malware determination method comprising:
a feature-selection setting step at which, prior to receiving input of an executable file, upon input of an attribute name of an attribute, the attribute with the input attribute name is registered in an attribute table as an attribute to be extracted, and upon input of an attribute value of an attribute, the input attribute value is registered in an attribute value table as an attribute value to be deleted or as an attribute value not to be deleted,
a feature extraction step at which, upon input of the executable file, a first attribute value of an attribute registered as an attribute to be extracted in the attribute table is extracted from the executable file and a feature vector including the extracted first attribute value as a feature is generated,
a feature selection step of performing deletion of a second attribute value registered as an attribute value to be deleted or deletion of an attribute value other than attribute values registered as attribute values not to be deleted in the attribute value table from the feature vector generated at the feature extraction step, to reconstruct the feature vector,
a classification step at which, when a feature vector of an executable file to be learned is reconstructed at the feature selection step, machine learning of the executable file to be learned is performed based on the feature vector and information indicating whether the feature vector of the executable file to be learned is malware, and at which, when a feature vector of an executable file to be determined is reconstructed at the feature selection step, a score of likelihood of malware is calculated for the executable file to be determined based on a result of the machine learning and the feature vector, and
a determination step of determining whether the executable file to be determined is malware based on the score of the executable file to be determined calculated at the classification step.

7. A non-transitory computer-readable recording medium having stored a program that causes a malware detection device to perform a method comprising:
a feature-selection setting step at which, prior to receiving input of an executable file, upon input of an attribute name of an attribute, the attribute with the input attribute name is registered in an attribute table as an attribute to be extracted, and upon input of an attribute value of an attribute, the input attribute value is registered in an attribute value table as an attribute value to be deleted or as an attribute value not to be deleted,
a feature extraction step at which, upon input of the executable file, a first attribute value of an attribute registered as an attribute to be extracted in the attribute table is extracted from the executable file and a feature vector including the extracted first attribute value as a feature is generated,
a feature selection step of performing deletion of a second attribute value registered as an attribute value to be deleted or deletion of an attribute value other than attribute values registered as attribute values not to be deleted in the attribute value table from the feature vector generated at the feature extraction step, to reconstruct the feature vector,
a classification step at which, when a feature vector of an executable file to be learned is reconstructed at the feature selection step, machine learning of the executable file to be learned is performed based on the feature vector and information indicating whether the feature vector of the executable file to be learned is malware, and at which, when a feature vector of an executable file to be determined is reconstructed at the feature selection step, a score of likelihood of malware is calculated for the executable file to be determined based on a result of the machine learning and the feature vector, and
a determination step of determining whether the executable file to be determined is malware based on the score of the executable file to be determined calculated at the classification step.

* * * * *